June 13, 1950   O. WITTEL   2,511,232
FILM LOOP FORMER
Filed Oct. 1, 1948
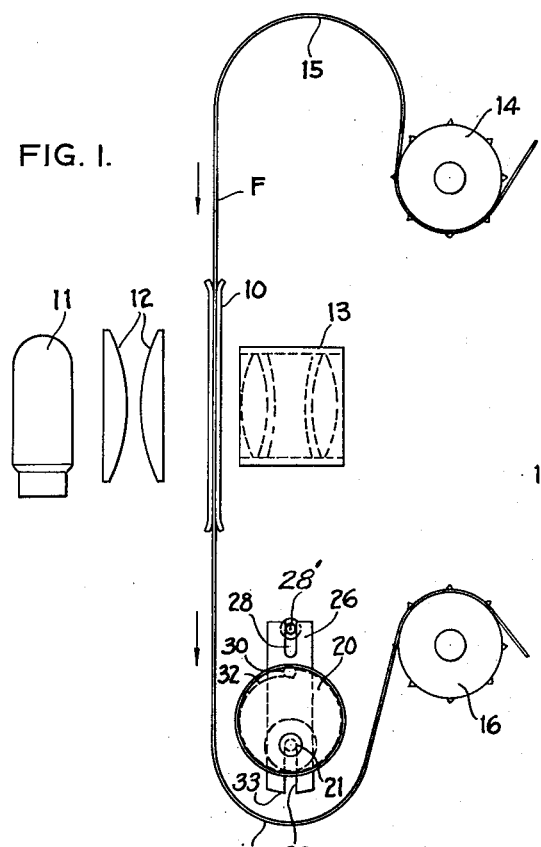
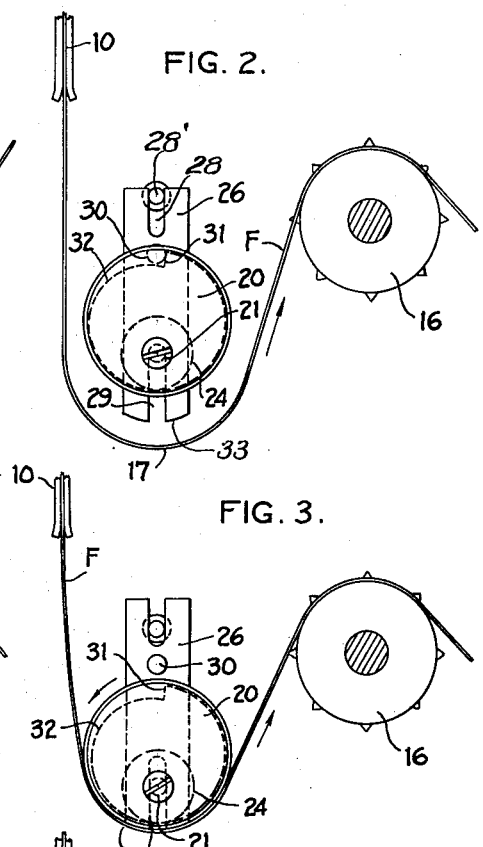
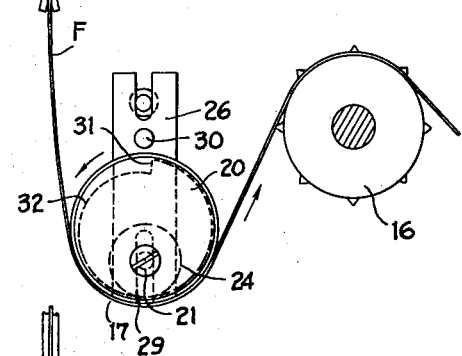
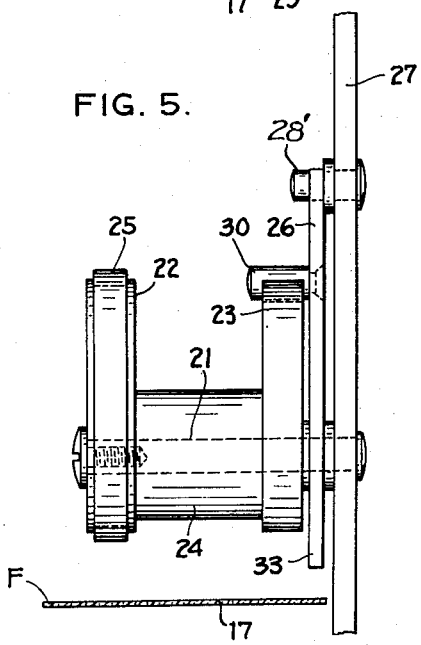
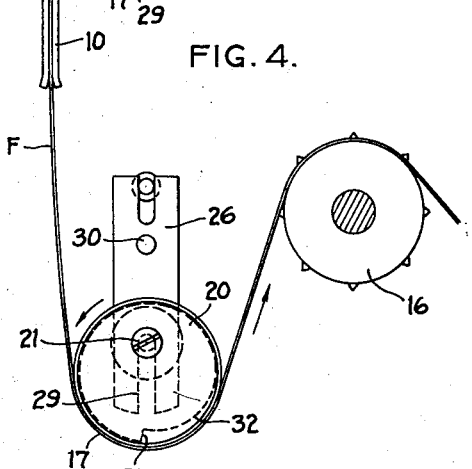
OTTO WITTEL
INVENTOR
BY
ATTORNEYS Patented June 13, 1950

2,511,232

UNITED STATES PATENT OFFICE 2,511,232

FILM LOOP FORMER

Otto Wittel, Rochester, N. Y., assignor to Eastman Kodak Company, Rochester, N. Y., a corporation of New Jersey Application October 1, 1948, Serial No. 52,266

4 Claims. (Cl. 271—2.2)

The present invention relates to photography, and particularly to a device for forming and/or maintaining the film loop in a motion-picture apparatus adjacent the film gate through which a film strip is intermittently moved.

The present invention is an improvement in the loop-forming device described and claimed in my copending patent application Serial No. 23,096, filed April 24, 1948, and particularly an improvement in the means for limiting the film loop-forming roller to a single rotation.

In my above-mentioned patent application I disclose a loop-forming device comprising an eccentrically mounted roller disposed in the film loop to be maintained and arranged so that its larger radius is normally disposed away from, or remote with respect to, the end of the loop when the loop is of proper size. If the loop diminishes in size sufficiently to cause the film to engage the shorter radius of a roller, then the roller is given a single rotation by the moving film whereupon the long radius of the roller re-forms the film loop. The roller is counterbalanced to normally assume an inoperative position wherein its larger radius is remote from the end of the film loop and is completely free from rubbing engagement with the film at all times when the loop is of such a size as will be formed by a rotation of the roller.

In order to prevent any tendency for said loop-forming roller to continue to rotate due to its own inertia after having been rotated once by the film, and being thus thrown into driving engagement with that portion of the film entering the loop, I show, in my above-mentioned application, among other embodiments, a friction latch which acts to stop and/or hold the roller in its full, counterbalanced position after it has completed one revolution. While such a friction catch, or latch, as I have shown in said application, has been found to operate satisfactorily in most instances, it is not positive in its operation, and some difficulty is experienced in properly adjusting the tension in the latch.

Accordingly, the primary object of the present invention is to provide a latching means for this loop-forming roller which will positively stop and hold the roller in its inoperative position after it has made one revolution to form the film loop, and in which position that portion of its periphery having the greater radius relative to the axis of rotation is in its most remote position from the bottom of the film loop.

Another object is to provide a positive latching means for this loop-forming roller which is released by the film in the loop upon said loop becoming foreshortened just prior to the time the film in the loop engages the periphery of the roller to drive the same.

And, a further object is to provide a positive latching means for this loop-forming roller which is simple in construction and operation so that it can be readily applied to existing projection apparatus, and a latching means which is moved to its normal operative position by gravity, so that a critical adjustment of springs, or other devices, is not required for its operation.

The novel features that I consider characteristic of my invention are set forth with particularity in the appended claims. The invention itself, however, both as to its organization and its methods of operation, together with additional objects and advantages thereof, will best be understood from the following description of the specific embodiments when read in connection with the accompanying drawings, in which Fig. 1 is a diagrammatic side elevational view of the parts of a motion-picture projector essential to a disclosure of the present invention, and showing a preferred embodiment of my loop-forming roller in its normal or inoperative position;

Figs. 2, 3, and 4 are enlarged diagrammatic views of the loop-forming roller and lower film sprocket with the film passing therebetween, and illustrating how the roller is moved by the film to re-form the loop when the loop becomes foreshortened, and also showing how the film in the loop acts to release the latch for the loop-forming roller to permit a single rotation thereof by the film engaging its periphery; and Fig. 5 is an enlarged side elevational view of the loop-forming roller and its associated latch, and illustrating how the latch is released by the foreshortening of the film loop.

Like reference characters refer to corresponding parts throughout the drawings.

Referring now to Fig. 1, a motion-picture projector is shown as comprising a film gate 10 through which a film strip F is intermittently moved past a projection aperture, not shown, by any sort of suitable intermittent pull-down mechanism, not shown. The projection aperture in the gate is illuminated by an illuminating system which may include a lamp 11 and a condenser assembly 12, while the illuminated frame of the film strip in alignment with the projection aperture is projected onto a screen by an objective 13.

The film strip is pulled from a supply reel, not shown, by a constantly rotated sprocket 14 and is fed into a loop 15 in advance of the gate, and from loop the film is drawn by the pull-down mechanism, as is well known. The film strip, upon leaving the gate, is fed over a constantly rotated sprocket 16 which feeds it to the take-up reel, not shown.

To permit the pull-down mechanism to properly feed the film through the gate, it is necessary to provide a free loop 17 in the film behind the gate and in advance of the sprocket 16. If this loop 17 becomes lost, or becomes of insufficient size, the sprocket 16 will tend to pull the film strip directly through the gate, irrespective of the pull-down mechanism, and the picture on the screen will appear to jump and the film perforations may become torn, and/or the pull-down mechanism may be damaged. This loss of loop may be caused by torn perforations in the film, or may be caused by improper threading of the machine, and it is usually necessary to stop the projector to readjust the loop if no loop-forming mechanism is provided, or, if one is provided, manual operation thereof by the operator is required.

In accordance with the present invention, a loop-forming roller 20 is disposed within the film loop 17 and has its axis parallel to the axis of said loop. This roller 20 is eccentrically mounted on a fixed stub shaft 21 so that it can rotate rather freely. This roller 20 is normally held in its inoperative position shown in Figs. 1 and 2 by a positive latching mechanism, as will be described hereinafter, and in which inoperative position the larger radius of the roller is remote from the end of the film loop 17 and the entire periphery of the roller is free from engagement with the film when the loop is of sufficient size for satisfactory operation of the pull-down mechanism.

When the film loop 17 becomes lost for any reason whatsoever, and the end thereof moves toward engagement with the smaller radius of the roller, as shown in Fig 3, the moving film strip first releases the latching means for the roller and then immediately picks up the roller 20 and causes it to rotate in a counterclockwise direction. Looking at Figs. 3 and 4, it will be seen that as the larger radius of the roller moves around into the loop, it will increase the size of the same by pulling the film through the gate past the pull-down and from the upper loop 15. Then, as the roller completes substantially one revolution, and the larger radius is about to leave engagement with the film, the loop has been reformed, and the roller returns to its normal position shown in Figs. 1 and 2, where it is free from engagement with the film strip.

In order to stop the roller 20 after it has made one complete revolution, and to positively hold the same in its inoperative position, the following releasable latching mechanism is provided. Looking at Fig. 5, the loop-forming roller 20 is shown as comprising a pair of disks 22 and 23 held in spaced relation by a hub 24, said hub rotatably engaging the stub shaft 21. The disk 22 is provided with a rubber tire 25 to provide a friction surface which is engaged by the face of the film as the loop becomes sufficiently foreshortened, and to permit the film to drive the roller. As will appear from an inspection of Fig. 5, the film F in the loop 17 overhangs the disks 22 and 23 of the loop-forming roller 20 and it will be understood that when the face of the film engages the rubber tire 25 on disk 22, it is slightly spaced from the periphery of disk 23. The disks 22 and 23 of the roller 20 may be cut away and counterbalanced, as shown in my above-noted pending application, but, in this instance, the counterbalance of this roller to its inoperative position is not necessary because of the nature of the positive latching means constituting the present invention.

The latching means for the film roller constituting the present invention comprises a plate 26 slidably mounted on the mechanism plate 27 of the projection apparatus by having a slot 28 in one end engaging a pin 28' fixed to, and extending from, the mechanism plate 27, and a slot 29 in the other end slidingly engaging the stub shaft 21 of the film roller 20. Fixed to, and extending from, the plate 26 is a stop pin 30 which overhangs the disk 23 of the roller 20 and is adapted to move to and from the periphery thereof in moving between a latching and an unlatching position, respectively. When the plate 26 drops to its normal position under the action of gravity (see Figs. 1 and 2), the stop pin 30 drops down toward the periphery of the disk 23 so that after the roller has completed one revolution, the pin 30 will come up against a radial shoulder 31 on the disk to positively stop and hold the roller from rotation. As shown in Fig. 2, the periphery of the disk 23 has a cam-shaped cut-away 32 leading up to this shoulder 31 so that the stop pin 30 riding on the periphery of the disk 23, due to gravity, will drop down and engage the shoulder 31 at the completion of a single revolution of the roller.

So that this latching means will be released to permit the roller to rotate when needed, the lower end 33 of the plate 26 normally extends below the periphery of the rubber tire 25 on the roller 20 when the stop pin is in its locking position. As clearly shown in Fig. 5, the end 33 of the plate 26 lies within the film loop 17 so that when the loop becomes foreshortened for any reason at all, and approaches the roller 20, the margin of film will engage and raise the plate and its pin 30 a sufficient distance to move pin 30 away from shoulder 31, just before the film engages the driving surface 25 on the disk 22. This condition of parts is shown in Fig. 3. Now the roller is free to rotate and the film, upon engaging the roller, starts to rotate it in a counterclockwise direction. Just as soon as the larger radius of the roller 20 moves into the film loop to restore it, the lower end 33 of plate 26 is freed and pin 30 drops down toward the periphery of the disk 23 to be in a position to engage the shoulder 31 and stop the roller upon completion of a single revolution. The operative position of stop pin 30 is determined by the end of slot 29 engaging the stub shaft 21, see Figs. 2 and 4.

By the very nature of this latching means for the loop-forming roller, it will be obvious that a counterbalancing of said roller, as advocated in my above-mentioned copending application, is not necessary, although such a counterbalancing might aid in tending to hold the shoulder 31 against the stop pin 30 when the film loop was of proper size. However, I have found that the normal amount of friction which is encountered in the journal bearing for the roller 20 can be relied upon to insure the shoulder 31 remaining at rest against the stop pin 30. In the event difficulty is encountered in roller 20 tending to bound back as shoulder 31 thereof engages pin 30, the counterbalancing of the roller might be resorted to, or the stop pin 30 and its associated plate 26 could be located slightly to the left of the vertical plane passing through the axis of the roller; or the periphery of disk 23 could be provided with a double-ended notch slightly wider than the diameter of the pin 30 and into which said pin could drop to positively lock the roller against rotation in either direction from its normal inoperative position.

It is believed that it will be clearly appreciated from the above disclosure that I have provided a positive latching means for the loop-forming roller which is very effective in operation, notwithstanding the simplicity and compactness of its construction, which permits it to be readily applied to existing projection apparatus. The latching means is effectively released by the film in the loop itself just before the film comes into driving engagement with the roller, and since the part of the mechanism engaged and moved by the film is so disposed as to engage only the margin of the film, no scratching or other destructive rubbing action is induced on the picture area of the film due to the presence of this roller latching means.

Although I have shown and described certain specific embodiments of my invention, I am fully aware that many modifications thereof are possible. My invention therefore is not to be limited to the precise details of construction shown and described, but is intended to cover all modifications coming within the scope of the appended claims.

Having thus described my invention, what I claim as new and desire to secure by Letters Patent of the United States is:

1. A device for forming and maintaining a film loop in a motion picture apparatus comprising a shaft disposed within said loop and extending axially thereof, a roller freely and eccentrically journalled on said shaft and capable of an inoperative position wherein the portion of its periphery farthest from said shaft will normally remain remote from the end of said loop, a frictional film-engaging surface on the periphery of said roller adapted to be engaged by the face of the film as said loop is sufficiently diminished in size, whereupon said roller will be rotated by movement of the film to restore or form said loop, means for positively latching said roller in its inoperative position, and means operated by the foreshortening of said loop for releasing said latching means just prior to the film engaging said roller.

2. A device according to claim 1 characterized by the fact that said latching means includes a latch member movable to and from an operative latching position and normally moved to said latching position, and a part connected with said latch member adapted to be engaged by the film as said loop is foreshortened to move said latch member from its operative latching position just prior to the film engaging said roller.

3. A device according to claim 1 characterized by the fact that said latching means comprises a latch element positively connected to said roller to be moved thereby, a latch member movable to and from an operative position wherein it engages said latch element to hold said roller against rotation, and means for mounting said latch member whereby it is normally moved to said operative position, and a part connected with said latch member extending into said loop below said roller and adapted to be engaged by the film as the loop becomes foreshortened to move said latch member from its operative latching position prior to the film engaging said roller.

4. A device according to claim 1 characterized by the fact that said latching means comprises a shoulder on that portion of the periphery of said roller farthest removed from its axis of rotation, a stop pin slidably mounted to move transversely of the axis of said roller to and from an operative position wherein it engages said shoulder to hold the roller against rotation, means for mounting said pin whereby it is normally moved to its operative position, and a plate connected to said pin including a portion extending into the film loop below the periphery of said roller when said pin is in its operative position and adapted to be engaged by the film in said loop as the loop is foreshortened to move said pin from its operative position just prior to the film engaging said roller.

OTTO WITTEL.

REFERENCES CITED

The following references are of record in the file of this patent:

UNITED STATES PATENTS

| Number | Name | Date |
| --- | --- | --- |
| 744,087 | Mergenthaler et al. | Nov. 17, 1903 |
| 2,407,795 | Nelson | Sept. 17, 1946 |
| 2,434,355 | Fairbanks | Jan. 13, 1948 |